350-314. SR
7-3-73 OR 3,743,390

United States Patent [19]

McCarthy et al.

[11] 3,743,390

[45] July 3, 1973

[54] CODED RETICLE HAVING A SHIFTED PSEUDO RANDOM SEQUENCE

[75] Inventors: Stephen G. McCarthy, Dobbs Ferry; Irving Roth, Williston Park; Edward W. Stark, Garden City, all of N.Y.

[73] Assignee: Sperry Rand Corporation, New York, N.Y.

[22] Filed: Sept. 3, 1971

[21] Appl. No.: 177,766

Related U.S. Application Data

[62] Division of Ser. No. 718,751, April 4, 1968, Pat. No. 3,617,724.

[52] U.S. Cl. ............ 350/314, 250/231 SE, 350/317

[51] Int. Cl. ............................................ G02b 5/22

[58] Field of Search .................... 350/315, 314, 317; 235/181; 250/219 R, 219 DD, 231 SE, 233

[56] References Cited

UNITED STATES PATENTS

| | | | |
|---|---|---|---|
| 3,497,239 | 2/1970 | Buhrer | 250/219 DD |
| 3,238,375 | 3/1966 | Johnson | 250/231 SE |
| 3,278,927 | 10/1966 | Vlasenko et al. | 250/231 SE |
| 3,323,120 | 5/1967 | Vehlin | 250/231 SE |
| 3,401,268 | 9/1968 | Lea | 250/219 |
| 3,549,897 | 4/1968 | Blake | 250/231 SE |

*Primary Examiner*—Ronald L. Wibert
*Assistant Examiner*—Ronald J. Stern
*Attorney*—S. C. Yeaton

[57] ABSTRACT

Optical radiant energy encoding and correlating apparatus for eliminating correlation residues including a movable reticle with a plurality of continuous loop tracks each having the same pseudo random code formed thereon for encoding incident radiation and means for correlating the encoded data with a plurality of phase shifted replicas of the pseudo random code, the code in each reticle track being shifted relative to the adjacent tracks by an amount equal to the width of the field focussed on the reticle and a sufficient number of tracks being provided so that the periphery of the field encompasses a complete code.

4 Claims, 12 Drawing Figures

PERIPHERAL RETICLE SEGMENT AT POSITION A

POSITION ILLUMINATED ON INTEGRATION PLANE

| | $a_o$ | $b_o$ | $c_o$ | $d_o$ | $e_o$ | $f_o$ | $g_o$ | $h_o$ | $i_o$ | $j_o$ | $k_o$ | $i_o$ | $m_o$ | $n_o$ | $p_o$ | TOTAL ENERGY |
|---|---|---|---|---|---|---|---|---|---|---|---|---|---|---|---|---|
| A | X | | | X | | | | | | | X | X | | | | 4 |
| B | X | | | | | | X | | | X | X | | | | | 4 |
| C | X | | | | | | | | X | X | | X | | | | 4 |
| D | X | | | | X | | | | X | | X | | | | | 4 |
| E | | | | X | | | X | | | X | | X | | | | 4 |
| F | | | | | | | X | | X | | X | X | | | | 4 |
| G | | | | | X | | | | | X | X | X | | | | 4 |
| H | X | | | X | X | | X | | X | X | X | X | | | | 8 |
| I | | | | X | | | | | X | X | X | | | | | 4 |
| J | | | | | X | | X | | X | X | | | | | | 4 |
| K | X | | | X | | | X | | X | | | | | | | 4 |
| L | X | | | | X | | X | | | | | X | | | | 4 |
| M | | | | X | X | | X | | | | X | | | | | 4 |
| N | X | | | X | X | | | | | X | | | | | | 4 |
| P | | | | X | X | | | | X | | | X | | | | 4 |

PERIPHERAL RETICLE SEGMENT AT POSITION A

| POSITION ILLUMINATED ON INTEGRATION PLANE | $a_o$ | $b_o$ | $c_o$ | $d_o$ | $e_o$ | $f_o$ | $g_o$ | $h_o$ | $i_o$ | $j_o$ | $k_o$ | $l_o$ | $m_o$ | $n_o$ | $p_o$ | TOTAL ENERGY |
|---|---|---|---|---|---|---|---|---|---|---|---|---|---|---|---|---|
| A | | | | X | | | | X | | | | X | | X | | 4 |
| B | | | | | | | X | | | X | | | X | | X | 4 |
| C | | | | | | | | | | X | | X | | X | X | 4 |
| D | | | | | | | | X | | | | | X | X | X | 4 |
| E | | | | X | | | X | X | | X | | X | X | X | X | 8 |
| F | | | | | | | | | | X | | X | | X | X | 4 |
| G | | | | | | | | X | | | | | X | X | X | 4 |
| H | | | | X | | | X | X | | X | | X | X | X | X | 8 |
| I | | | | | | | X | | | | | X | X | X | | 4 |
| J | | | | | | | | X | | X | | X | X | | | 4 |
| K | | | | X | | | X | X | | X | | X | X | X | X | 8 |
| L | | | | | | | X | | | | | X | X | X | | 4 |
| M | | | | | | | | X | | X | | X | X | | | 4 |
| N | | | | X | | | X | | | X | | X | | | | 4 |
| P | | | | X | | | | X | | X | | | | | X | 4 |

PERIPHERAL RETICLE SEGMENT AT POSITION A

POSITION ILLUMINATED ON INTEGRATION PLANE

| | $a_o$ | $b_o$ | $c_o$ | $d_o$ | $e_o$ | $f_o$ | $g_o$ | $h_o$ | $i_o$ | $j_o$ | $k_o$ | $l_o$ | $m_o$ | $n_o$ | $p_o$ | TOTAL ENERGY |
|---|---|---|---|---|---|---|---|---|---|---|---|---|---|---|---|---|
| A | 2X | 2X | | | | | | | | | | 2X | | 2X | | 8 |
| B | 2X | 2X | | | | | | | | 2X | | | | | 2X | 8 |
| C | 2X | 2X | | | | 2X | | | 2X | 2X | | 2X | | 2X | 2X | 16 |
| D | 2X | | | | | | | | 2X | | | | | 2X | 2X | 8 |
| E | | | | | | | | | | 2X | | 2X | | 2X | 2X | 8 |
| F | | | | | | 2X | | | 2X | | | 2X | | 2X | | 8 |
| G | | 2X | | | | 2X | | | | 2X | | 2X | | | | 8 |
| H | 2X | | | | | | | | 2X | 2X | | 2X | | | | 8 |
| I | | | | | | 2X | | | 2X | 2X | | | | | 2X | 8 |
| J | | 2X | | | | | | | 2X | 2X | | | | 2X | | 8 |
| K | 2X | 2X | | | | 2X | | | 2X | | | | | | | 8 |
| L | 2X | | | | | 2X | | | | | | 2X | | | 2X | 8 |
| M | | 2X | | | | 2X | | | | | | | | 2X | 2X | 8 |
| N | 2X | | | | | 2X | | | | 2X | | | | 2X | | 8 |
| P | | 2X | | | | | | | 2X | | | 2X | | | 2X | 8 |

PERIPHERAL RETICLE SEGMENT AT POSITION A

POSITION ILLUMINATED ON INTEGRATION PLANE

| | $a_o$ | $b_o$ | $c_o$ | $d_o$ | $e_o$ | $f_o$ | $g_o$ | $h_o$ | $i_o$ | $g_o$ | $k_o$ | $l_o$ | $m_o$ | $n_o$ | $p_o$ | TOTAL ENERGY |
|---|---|---|---|---|---|---|---|---|---|---|---|---|---|---|---|---|
| A | 3X | 2X | | X | | | | | | | X | 3X | | 2X | | 12 |
| B | 3X | 2X | | | | | X | | | 3X | X | | | | 2X | 12 |
| C | 3X | 2X | | | | 2X | | | 3X | 3X | | 3X | | 2X | 2X | 20 |
| D | 3X | | | | X | | | | 3X | | X | | | 2X | 2X | 12 |
| E | | | | X | | | X | | | 3X | | 3X | | 2X | 2X | 12 |
| F | | | | | | 2X | X | | 3X | | X | 3X | | 2X | | 12 |
| G | | 2X | | | X | 2X | | | | 3X | X | 3X | | | | 12 |
| H | 3X | | | X | X | | X | | 3X | 3X | 2X | 2X | | | | 16 |
| I | | | | X | | 2X | | | 3X | 3X | X | | | | 2X | 12 |
| J | | 2X | | | X | | X | | 3X | 3X | | | | 2X | | 12 |
| K | 3X | 2X | | X | | 2X | X | | 3X | | | | | | | 12 |
| L | 3X | | | | X | 2X | X | | | | | 3X | | | 2X | 12 |
| M | | 2X | | X | X | 2X | X | | | | X | | | 2X | 2X | 12 |
| N | 3X | | | X | X | 2X | | | | 3X | | | | 2X | | 12 |
| P | | 2X | | X | X | | | | 3X | | | 3X | | | 2X | 12 |

CODED RETICLE HAVING A SHIFTED PSEUDO RANDOM SEQUENCE

CROSS REFERENCE TO RELATED APPLICATION

This is a division of application Ser. No. 718,751 filed Apr. 4, 1968 now U.S. Pat. No. 3,617,724 entitled, "Shifted Sequence Pseudo Random Coded Reticle Correlation Apparatus," in the names of Stephen G. McCarthy, Irving Roth and Edward W. Stark.

BACKGROUND OF THE INVENTION

The present invention relates to optical radiant energy encoding apparatus and means for correlating the encoded data to provide a correlation function devoid of residues thereby enhancing signal-to-noise ratio and precluding the occurrence of ambiguities.

Apparatus responsive to optical radiant energy emitted from a source may be used simply for detecting the presence of the source or in more sophisticated applications for determining the position of the radiation source within the field of view of the receiver and perhaps for forming an image of the source. Depending upon the characteristics of the apparatus, it may perform only one or any combination of these functions. For example, an optical receiver which simply focusses incident radiation on a photodetector can detect radiating sources but cannot distinguish between sources or discriminate them against the background. Consequently, several techniques of varying degrees of complexity have been developed to achieve these capabilities. One system uses an optical receiver having a very small field of view, thus limiting the background against which a radiating source is observed. Since the background is small, noise is reduced and signal-to-noise ratio is enhanced. To observe a larger field, however, it is necessary to sweep the receiver throughout the field in a prescribed manner. As a result, a radiating source is observed only during the interval that it is being scanned by the receiver. This diminishes signal magnitude and degrades signal-to-noise ratio. In addition, the inability to observe the entire field continuously increases the likelihood that a short pulse of radiant energy will not be detected. Signal-to-noise ratio enhancement is usually the primary concern, however, particularly for operation in the infrared and ultraviolet portions of the optical spectrum because radiation detectors sensitive to energy at these wavelengths are inherently noisy.

The limitations of the scanning method have been overcome by the development of large area fixed field systems utilizing a vidicon, detector matrix or encoding reticle for achieving object locating and imaging capabilities. Vidicons are generally used only for sensing radiation in the visible region of the electromagnetic spectrum. Infrared vidicons are available, but have low resolution and sensitivity. Detector matrices, on the other hand, are unwieldy to fabricate, especially high resolution devices, because each detector must have wires connected to it. Moreover, it is difficult to obtain a multiplicity of detectors having uniform responsivity as is required to assure that the matrix does not distort the received energy. For these reasons, encoding recticles are generally preferred to infrared and ultraviolet applications. Numerous coded recticle patterns have been developed in the prior art for providing the aforementioned capabilities regarding detection, discrimination, locating and imaging and more recently correlation techniques have been applied to coded reticle systems to achieve further improvement in signal-to-noise ratio.

To understand better the function and utility of the present invention, consider the following general remarks pertaining to correlation. Auto-correlation is defined as the integral of the product of the function of an independent variable and the same function taken over a continuous range of values of the independent variable. Cross-correlation is defined as the integral of the product of one function of an independent variable and another function of the same independent variable or a different function of another variable taken over a continuous range of values of the independent variable. The required range of integration may extend from zero to infinity in some cases but practical limitations of operating equipment will always restrict it to some finite range. In any case, it is not necessary to integrate in a range where the function is known to have a value of zero. One prior art fixed field correlator system for detecting, locating and imaging radiant energy sources uses a first rotatable recticle with a plurality of tracks each having a different code formed thereon for imparting a unique code to incident radiation in accordance with the position of the radiating object in the field of the optical receiver. Correlation of the encoded data is accomplished by means of a second identical coded synchronously rotating reticle which is maintained in a fixed spacial orientation with the first recticle and illuminated by a light source controlled by the encoded signal. A photosensitive device, such as a vidicon, positioned behind the second recticle performs the integration. Thus, the encoded data is auto-correlated with a replica of itself and cross-correlated with a plurality of other codes, the correlation point being the position in the integration plane which is intercepted by a succession of code bits on the second recticle corresponding to the code driving the light source. This point receives maximum light energy since a transparent code bit passes it each time the light source is flashed on. All the other points, the non-correlation points, in the integration plane receive light approximately half the time the light is flashed on. Since the non-correlation points do not all receive exactly the same amount of light, a major problem of prior art optical correlation devices has been the non-uniformity of the correlation function produced in the integration plane. The desired correlogram is one having a peak at the correlation point with a uniform background at the non-correlation points to preclude ambiguity regarding the number and location of objects in the field. The non-uniformity of the background caused by the correlation process is commonly referred to as correlation residues.

SUMMARY OF THE INVENTION

In a preferred embodiment of the present invention, a disc shaped rotatable reticle with a plurality of annular bands each having the same pseudo random code formed thereon by segments, respectively, transparent and opaque to radiation of a predetermined wavelength is positioned at the focal plane of an optical receiver to modulate incident radiant energy emitted from an object in the field of the receiver, the aerial dimensions of the field being defined by a stop located adjacent the reticle. A code in each annular band is shifted relative to the contiguous bands by an amount equal to the width of the field and a sufficient number of bands is used so that the field contains a complete code. Rotation of the reticle in the focal plane causes a succession of transparent and opaque segments to intercept the radiant energy and encode it accordingly. Thereafter, the encoded energy is collected by a lens and directed onto a photodetector to produce a correspondingly coded electrical signal. Since one complete code lies within the field of the receiver, the energy is uniquely coded in accordance with its position in the focal plane which in turn depends upon the location of the object in the field of view. A visual readout of object location in the field or the provision of an image of the object is then obtained by correlating the encoded electrical signal either electronically or optically with a plurality of phase shifted replicas of the encoded signal. To decode the entire field each replica is shifted by one bit relative to another and the total number of replicas corresponds to the total number of bits in the code. In those instances where it is desired to decode only that portion of the field in the vicinity of a detected object, each replica may be shifted by more than one bit relative to another and the total number of replicas may be less than the total number of bits in the code. Operation in this manner reduces the amount of equipment required and may be employed, for example, when it is desired to observe motion of an object after it has been located.

In the case of optical correlation, the coded electrical signal derived from the photodetector is used to drive a glow modulator which uniformly illuminates a section of a second reticle spacially aligned, identically coded and synchronously rotated with the encoding reticle, the illuminated section of the second reticle containing a complete code as described with reference to the encoding reticle. One point in the plane of the second reticle will have coded segments passing through it corresponding to the signal driving the glow modulator and in fact will correspond to the point on which the radiant energy is incident on the encoding reticle. Hence, a photosensitive light integrating screen placed behind the second reticle receives a maximum amount of light energy at this point. This is the correlation point. Since only a single code is used on the reticle, there is no necessity for performing a cross-correlation thus eliminating one source of correlation residues. In addition, since the code which is used is pseudo random in nature and only one code length appears in the field, the auto-correlation of the encoded signal with the phase shifted replicas does not produce any correlation residues. Thus, the correlation point is presented against a uniform background. This is also true when more than one object is present in the field of view as will become apparent after reading the subsequent description of the preferred embodiment.

DESCRIPTION OF THE PREFERRED EMBODIMENT

Figure 1:
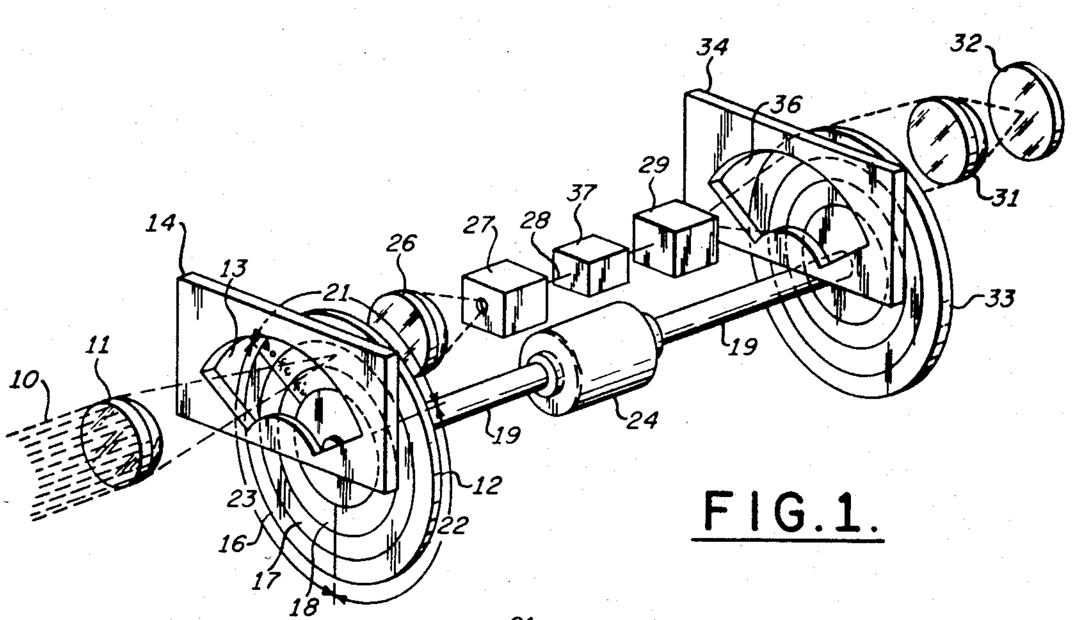
FIG. 1 is a perspective view of an optical correlator embodiment of the invention incorporating a shifted sequence pseudo random coded reticle.

Referring to FIG. 1, optical radiant energy depicted by light rays 10 entering input lens 11 is focussed on encoding reticle 12, the spacial position of the focussed energy being determined in accordance with the location of the radiant energy emitting source in the field of view of the input lens. Aperture 13 in stop 14 placed immediately in front of the reticle in non-contacting relationship therewith defines the shape of the field formed thereon such that it conforms to the outline of discrete code sections on the reticle, as will be explained in greater detail subsequently. Annular bands 16, 17 and 18 on the reticle each have the same pseudo random code formed thereon by respective segments (bits), respectively, transparent and opaque to radiation in the wavelength band in which the equipment is intended to operate, the transparent bits being represented by the clear segments and the opaque bits by the dark segments. The code in each band is shifted relative to the contiguous bands by an amount equal to the width of the field defined by the apertures in the stop. Thus, in the case of the fifteen bit code selected for illustration, code bit $a_o$ in outer band 16 is shifted by five bits relative to code bit $a_c$ in central band 17 and by 10 bits relative to code bit $a_i$ in inner band 18. A sufficient number of annular bands is provided so that each of the reticle sections 21, 22 and 23, corresponding to the outline of the field formed by mask 14, contains a complete code. In actual practice, the code length is chosen so that the number of bits in the code exactly or very nearly matches the number of resolution elements desired in the field.

The reticle is rotated in the focal plane of the input lens by shaft 19 connected to motor 24, thus causing the radiation incident on the reticle to be modulated in accordance with the transparency and opacity of the successive bits intercepting the radiation path. Since a discrete code bit occupies a given position in the field at any instant, rotation of the reticle will encode the incident radiation with a unique time delay determined by the location of the object in the field. A condenser lens 26 positioned behind the encoding reticle collects the modulated energy and directs it onto photodetector 27 which provides a correspondingly modulated electrical signal on its output lead 28. In some instances where the field is comparatively small, the condenser lens can be discarded and the photodetector positioned immediately adjacent the reticle. The signal at the output of the photodetector is now uniquely coded in accordance with the position of the focussed energy in the plane of the reticle which in turn depends upon the location of the radiant energy emitting source in the field of view of the input lens. The encoded electrical signal can therefore be processed to determine the location of the radiant energy emitting object in the field or to provide an image thereof, for example, by autocorrelating the encoded signal with a plurality of phase shifted replicas of the encoded signal, each replica being shifted relatively to another by one code bit and the number of replicas being equal to the number of bits in the code. As previously mentioned, autocorrelation involves the integration over a range of values of the product of a function of a variable and phase shifted replicas of the same function. The correlation may be performed electronically by using a shift register to generate the plurality of phase shifted replicas which are then multiplied with the encoded signal by means of ANALOG AND GATES and integrated by conventional capacitive type circuits. Alternatively, the correlation may be performed as shown in FIG. 1 by electro-optical means comprising a glow modulator 29, imaging lens 31, photosensitive integrating element 32, multiplier reticle 33, which is also connected to shaft 19 to rotate in synchronism with encoding reticle 12 with which it is spacially oriented and identically coded, and mask 34 having an aperture 36 outlining an area on the multiplier reticle corresponding to the field defined on the encoding reticle by stop 14. The modulated signal on the output lead of photodetector 27 is applied through amplifier 37 to the glow modulator which normally operates in the off state and flashes on in proportion to the magnitude of a signal applied thereto each time a transparent bit on reticle 12 crosses the radiation path of the radiant energy focussed thereon. When the glow modulator flashes on, the multiplier reticle is uniformly illuminated causing light to pass through transparent segments onto corresponding points on the surface of integrating element 34 on which an image of the multiplier reticle is formed by imaging lens 31. As a result, the correlation point receives light energy each time the glow modulator flashes on while all other points receive light only half the time. Thus, the correlation point on the photosensitive element appears as a bright spot against a semibright background. In some instances, the imaging lens may be eliminated and the integrator placed immediately behind the multiplier reticle but generally this is not physically possible particularly where readout and erasure of the integrated data is required. In such cases, the photosensitive integrating surface may be, for example, the light responsive element of a vidicon which can be read out at the end of each code period, that is, after each revolution of the reticle, in response to a signal from a magnetic pick-off or other device affixed to one of the reticles.

To understand the operation of the optical correlation and the significance of coding the reticles specifically in the aforementioned manner, reference should now be made to FIGS. 2 through 7. First, referring to FIG. *2a*, the reticle shown in the figure is the equivalent of the reticles used in the embodiment of FIG. 1. The capital letters A–P in each coded segment of section 21 represent fixed spacial positions in a plane immediately in back of the multiplier reticle or in the plane of the integrating element where an image of the reticle is produced by imaging lens 31. The small letters a-p designate code segments on the reticle, the subscripts *i*, *c* and *o* referring respectively to code segments in the inner, center and outer bands of the reticle. Assume that the reticle rotates in a counterclockwise direction and that incident radiation is focussed on position H corresponding to code bit $h_c$ at the instant the reticle has rotated to the illustrated position. Energy then passes through the encoding reticle 12 producing a modulated signal at the output of the photodetector and causing the glow modulator to illuminate section 21 of the multiplier reticle. Thus, light from the glow modulator passes through code bits $a_o$, $b_o$, $c_o$, $d_o$, $h_c$, $k_i$, $l_i$ and $n_i$ to positions A, B, C, D, H, K, L and N on the integration plane. The table in FIG. *3a* indicates the various positions in the integrating plane on which light (X) from the glow modulator impinges as each code bit in the outer annular band moves into alignment with position A on the integration plane. For instance, when the reticle rotates in a counterclockwise direction through annular displacement equal to the width of three code bits, code bit $d_o$ becomes aligned with position A as shown in FIG. *2b*. At this instant, the glow modulator once again uniformly illuminates the surface of the multiplier reticle exposed behind mask 34 as a result of radiant energy passing through code bit $k_c$ on the encoding reticle whereupon light passes through code bits $d_o$, $h_o$, $k_c$, $l_c$, $n_i$, $a_i$, $b_i$ and $c_i$ to positions A, E, H, I, K, M, N and P in the integration plane. When a shaded section such as code bit $i_c$ rotates into alignment with position H, on which the received optical radiant energy is incident, the glow modulator remains off and no light reaches the integration plane. For each complete revolution of the reticle, it is seen that position H receives eight units of light intensity while all other positions receive only four units. Thus, the correlation point H on the integration plane appears against a uniform background as shown in FIG. *3b* thereby precisely establishing the location of the emitting object in the field of view. Similarly, correlation patterns will be produced for other positions of the radiating objects in the field of view, the correlation point moving in the integration plane in accordance with the position of the radiating object in the field.

Figure 4:
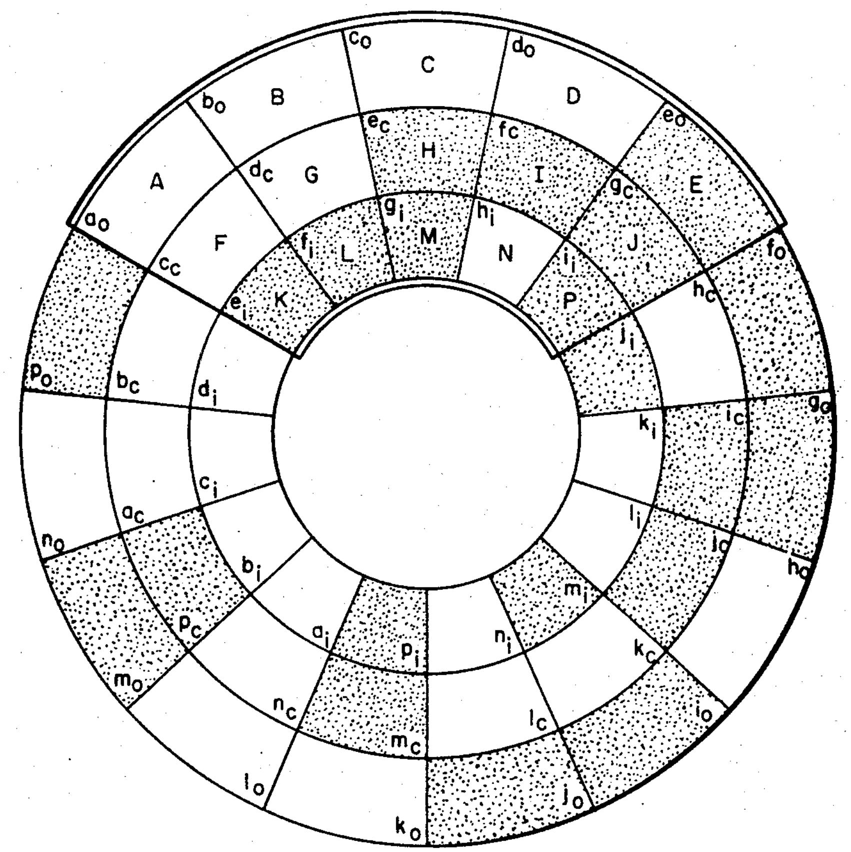
FIG. 4 depicts a pseudo random coded reticle on which the annular bands are shifted by amounts less than the width of the field to which the reticle is exposed.
Figures 5A, 5B:
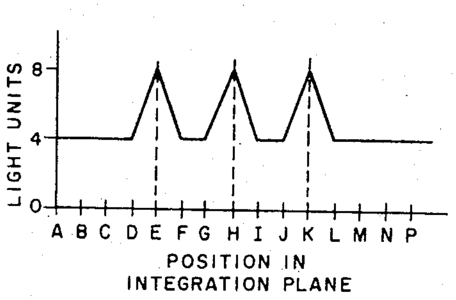
FIG. 5*a* is a table indicating the various positions in the integration plane upon which light impinges during one complete revolution of the reticle shown in FIG. 4 for optical radiant energy impinging on one code bit.
FIG. 5*b* is a correlogram produced from the data of FIG. 5*a;*

Now consider what is likely to happen if the reticle is coded in a different manner. In FIG. 4, the same pseudo random code is inscribed on the reticle but the code in each annular band is shifted by only 2 bits relative to the adjacent bands while the width of the field is maintained 5 bits wide. The table in FIG. 5 indicates the amount of light impinging on the various points in the integration plane. Again assuming that optical radiant energy is focussed on the code bit aligned with position H, which for the illustrated orientation of the reticle corresponds to code bit $e_c$. Using the same procedure as was used for developing the table in FIG. 3*a*, it is seen from the table in FIG. 5*a* and the accompanying correlogram shown in FIG. 5*b* that a reticle code as shown in FIG. 4 produces eight units of light intensity at positions E, H and K in the integration plane while all other positions receive only four units. Thus, a single radiant energy emitting object aligned with position H produces equal intensity images at three positions. For other positions of the radiating object in the field the non-correlation points may be equal in intensity and less than the correlation point as described for the preferred reticle code in FIG. 2*a* or perhaps of varying intensity but less than the intensity at the correlation point. In any event, the likelihood that ambiguity may result seriously detracts from the discrimination, detection, locating and imaging capability of the device. Moreover, it should be readily appreciated from the foregong that if two or more radiating objects are present in the field simultaneously, the correlation residues produced will cause even greater distortion of the actual field.

Figure 2A:
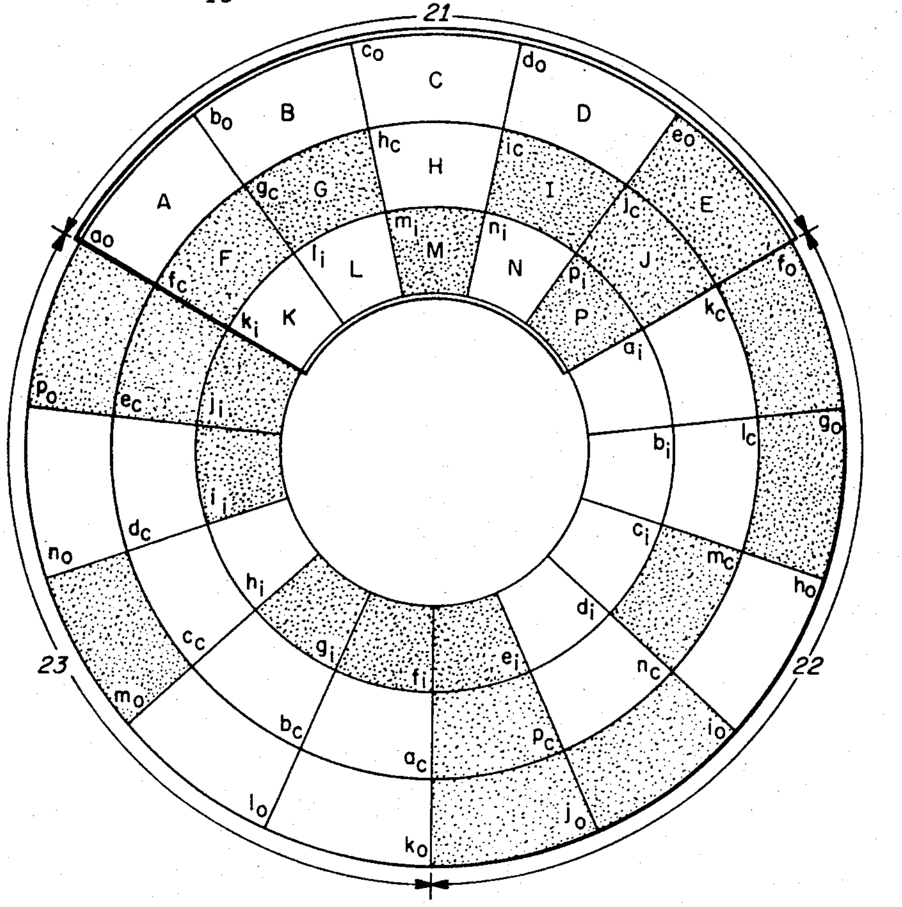
FIGS. 2*a* and 2*b* depict a shifted sequence pseudo random coded reticle in two discrete spacial orientations occurring during the operation of the embodiment shown in FIG. 1.
Figure 2B:
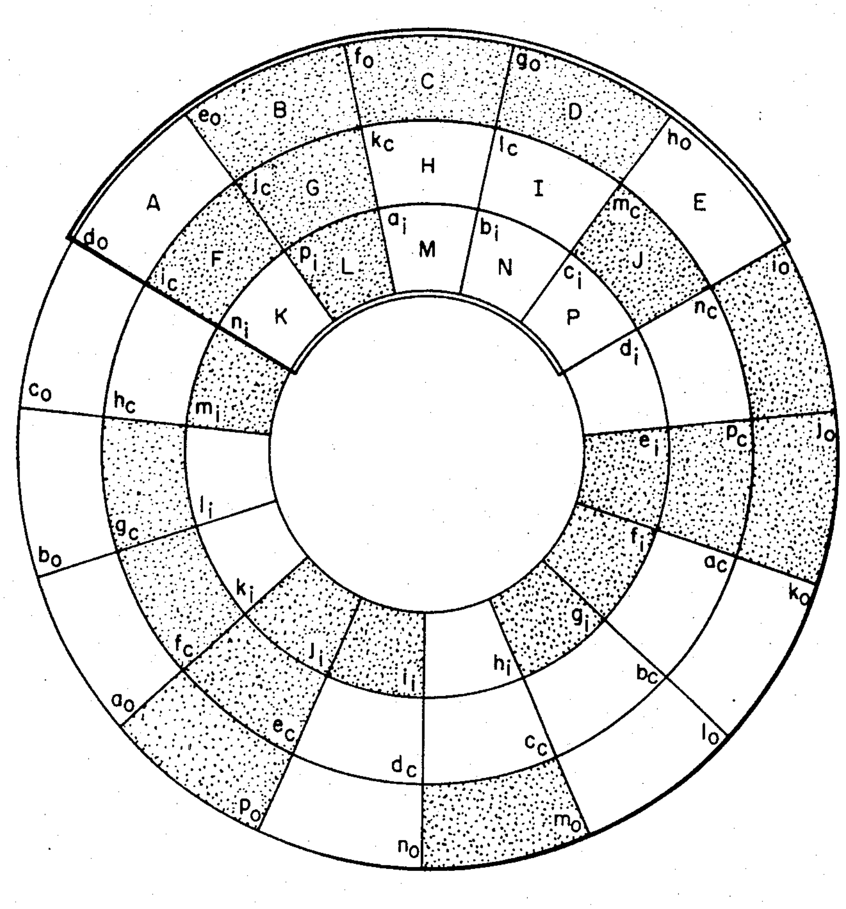
Figures 3A, 3B:
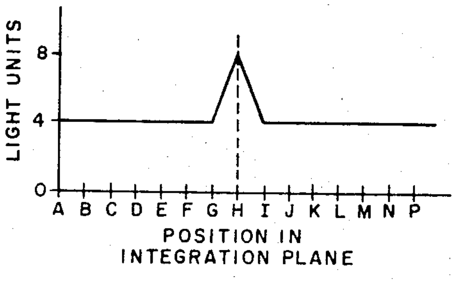
FIG. 3*a* is a table indicating the various positions in the integration plane of the embodiment of FIG. 1 upon which light impinges during one complete revolution of the reticle shown in FIG. 2*a* for optical radiant energy assumed to be incident on one code bit.
FIG. 3*b* is a correlogram produced from the data in the table of FIG. 3*a;*
Figures 6A, 6B:
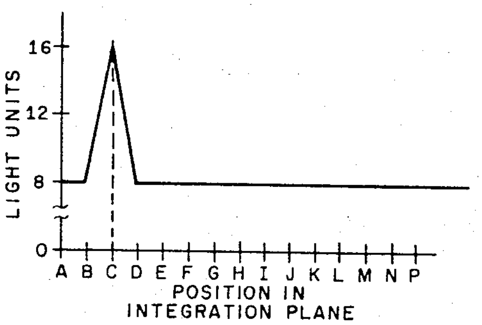
FIG. 6*a* is a table indicating the various positions in the integration plane upon which light impinges during one complete revolution of the reticle shown in FIG. 2*a* for optical radiant energy of increased intensity impinging on one code bit.
FIG. 6*b* is a correlogram produced from the data in FIG. 6*a;*
Figures 7A, 7B:
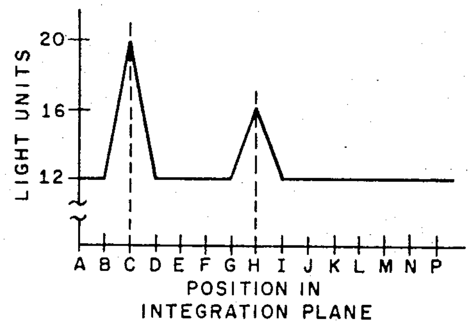
FIG. 7*a* is a table indicating the various positions in the correlation plane upon which light impinges during one complete revolution of the reticle shown in FIG. 2*a* for optical radiant energy of unequal intensity impinging on two discrete code bits.
FIG. 7*b* is a correlogram produced from the data in FIG. 7*a*.

The imaging capability of the shift sequence pseudo random coded reticle used in the preferred embodiment will now be described with reference to FIGS. 2*a*, 6*a* and 6*b*. Assume that radiating objects in the field are aligned with positions C and H corresponding respectively to code bits $c_o$ and $h_c$ in the illustrated position of the reticle in FIG. 2*a*. Further, assume that the object aligned with the position C has twice the intensity from the viewpoint of the optical receiver as the object aligned with position H. In this case, each object produces a correlation pattern in the integration plane. The object at position H produces the correlation function shown in FIG. 3*b* as previously explained while the object at position C produces the correlation pattern shown in FIG. 6*b* generated from the information in FIG. 6*a*. The table of FIG. 6*a* for the object aligned with position C is generated in the same manner as for the table relating to the object aligned with position H except that two units of light intensity pass through each transparency on the encoding reticle causing the glow modulator to be driven twice as hard and produce two units of light intensity on the integrated screen at each point behind the multiplier reticle every time the glow modulator is flashed on. For instance, with the reticle oriented as shown in FIG. 2*a*, the object focussed on segment C of the encoding reticle causes two units of light intensity to pass through code bits $a_o$, $b_o$, $c_o$, $d_o$, $h_c$, $k_i$, $J_i$ and $n_i$ on to positons A, B, C, D, H, K, L and N. Addition of the tables and correlograms shown in FIGS. 3 and 6 produces the resultant table and correlograms shown in FIGS. 7*a* and 7*b*. It is therefore seen that the correlation point at position H caused by the object aligned with that position in the field receives 16 units of light and the correlation point at position C caused by the object at that position receives twenty units of light while the non-correlation points each receive 12 units of light. Thus, the uniformity of the background is preserved and the image at point C is properly represented as being twice the intensity of the image at point H relative to the background as a reference level. Since each object is discriminated and its relative intensity in the field is preserved in the image plane, the object locating and imaging capability of the apparatus is demonstrated.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A coded reticle comprising:
a plurality of continuous loop adjacently disposed tracks, each containing the same binary pseudo random code and each having the same number of code bits wherein the respective code bits within each track are formed by discrete equally sized segments serially disposed along the tracks,
the length of each track and the size of the segments forming code bits therein being proportioned so that each track contains a complete code and a predetermined partial length of each track contains an identical number of code bits,
the code in all the tracks being shifted relative to one another such that the code in each track is shifted relative to the code in another track by an amount corresponding to the number of code bits in the predetermined partial length of track, and
the number of tracks being equal to the number of bits in the code divided by the number of code bits in the predetermined partial length of track, whereby the predetermined partial length of each track in combination with the predetermined partial length of all the other tracks contain the complete pseudo random code.

2. The apparatus of claim 1 wherein the code in each track is shifted relative to the adjacent tracks by a number of code bits equal to the number of bits in the predetermined partial length of track.

3. The apparatus of claim 2 wherein the pseudo random code is formed by segments respectively transparent and opaque to radiation of a predetermined wavelength band.

4. The apparatus of claim 3 wherein the reticle is a disc on which the continuous loop tracks form annular bands and the arcuate extent of the segments forming the code bits in each band is equal to the arcuate extent of the segments forming the code bits in any other band.

* * * * *